US011473278B2

(12) United States Patent
Lev

(10) Patent No.: US 11,473,278 B2
(45) Date of Patent: Oct. 18, 2022

(54) SWITCHING TECHNOLOGY FOR FAUCETS

(71) Applicant: SIDUS TECHNOLOGIES, INC., West Bloomfield, MI (US)

(72) Inventor: Mordechai Lev, West Bloomfield, MI (US)

(73) Assignee: SIDUS TECHNOLOGIES INC., West Bloomfield, MI (US)

(*) Notice: Subject to any disclaimer, the term of this patent is extended or adjusted under 35 U.S.C. 154(b) by 632 days.

(21) Appl. No.: 16/347,060

(22) PCT Filed: Nov. 8, 2017

(86) PCT No.: PCT/US2017/060697
§ 371 (c)(1),
(2) Date: May 2, 2019

(87) PCT Pub. No.: WO2018/089537
PCT Pub. Date: May 17, 2018

(65) Prior Publication Data
US 2021/0293006 A1 Sep. 23, 2021

Related U.S. Application Data

(60) Provisional application No. 62/418,912, filed on Nov. 8, 2016.

(51) Int. Cl.
*E03C 1/04* (2006.01)
*F16K 7/16* (2006.01)
(Continued)

(52) U.S. Cl.
CPC .............. *E03C 1/0412* (2013.01); *F16K 7/16* (2013.01); *F16K 19/006* (2013.01); *F16K 31/56* (2013.01); *Y10T 137/9464* (2015.04)

(58) Field of Classification Search
None
See application file for complete search history.

(56) References Cited

U.S. PATENT DOCUMENTS 5,383,604 A 1/1995 Boesch
2004/0061083 A1* 4/2004 Cheng ................. F16K 31/1262
251/30.01
(Continued)

FOREIGN PATENT DOCUMENTS

GB 2085127 A 4/1982
WO WO2014197903 A1 12/2004

OTHER PUBLICATIONS

Supplemental ESR, issued Apr. 30, 2020, in Appln. No. EU1 7870161.1.

*Primary Examiner* — Daphne M Barry
(74) *Attorney, Agent, or Firm* — Blue Filament Law PLLC

(57) ABSTRACT

A set of universal switching modules is provided for mechanical touch faucets. The switching modules afford the same operational benefits and features as an electronic faucet without the necessity of resort to an electrical power supply, eliminating the need for electronic control circuitry, and simplifying installation while increasing long term operational reliability. The switching modules are activated by a linear depressing or a rocking motion that contrasts with rotary motions associated with rotating a valve stem. The switching module designs are agnostic to the faucet design meaning that the switching modules are universal in that the modules fit any faucet design. The switching modules work with a variety of activation methods used in faucet design illustratively including rocker switch concepts, push concepts, and a horizontal/perpendicular push concepts. Faucet
(Continued)

manufacturers purchase a module based on the type of activation that they prefer for seamless integration in their faucet design.

13 Claims, 16 Drawing Sheets

(51) Int. Cl.
*F16K 11/00* (2006.01)
*F16K 31/56* (2006.01)

(56) References Cited

U.S. PATENT DOCUMENTS

| | | |
|---|---|---|
| 2004/0088786 A1 | 5/2004 | Malek |
| 2004/0135013 A1 | 7/2004 | Heren |
| 2004/0227014 A1 | 11/2004 | Williams |
| 2005/0199841 A1 | 9/2005 | O'Maley |
| 2006/0096642 A1 | 5/2006 | Matsui et al. |

* cited by examiner

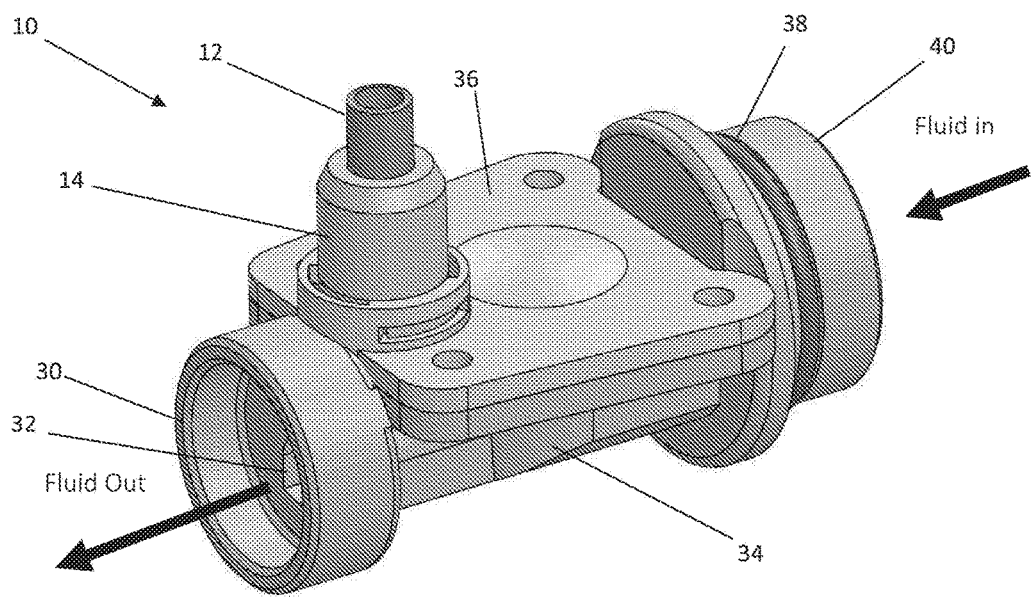
FIG. 1A
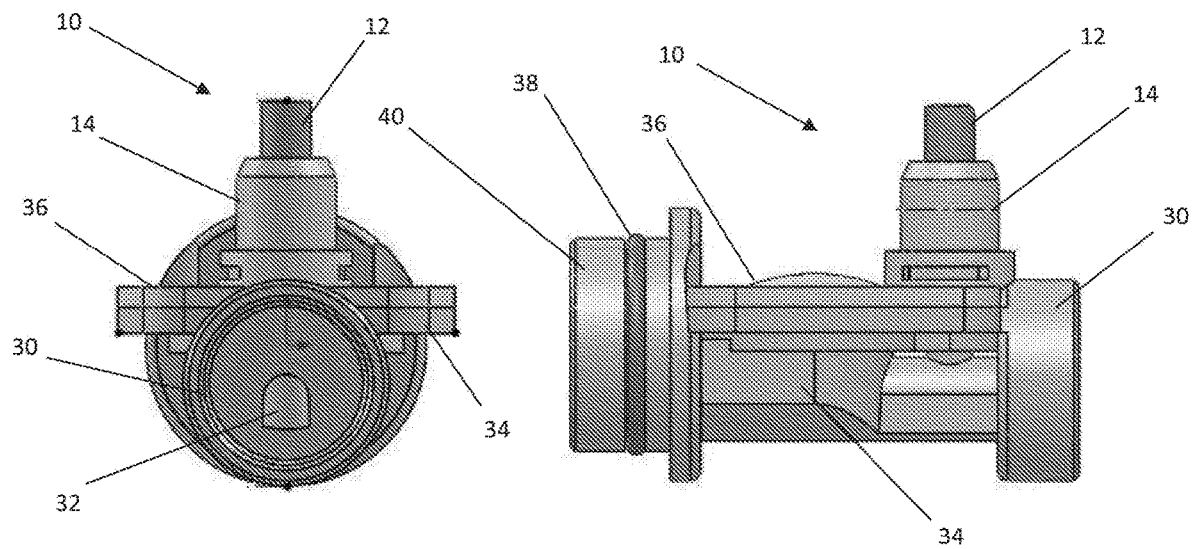
FIG. 1B
FIG. 1C

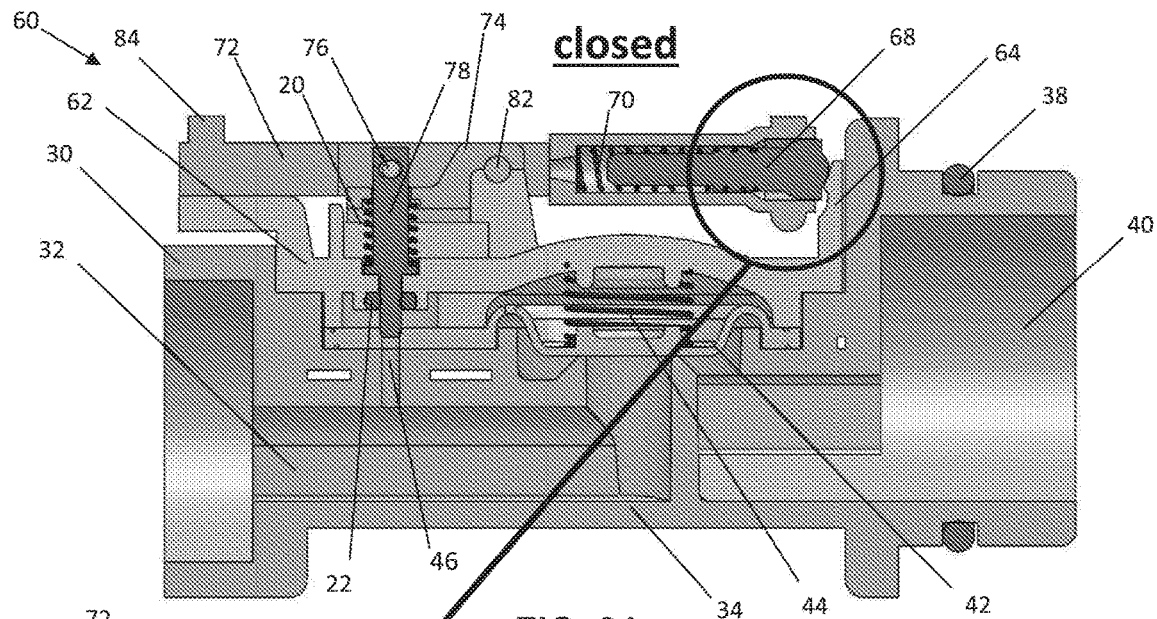
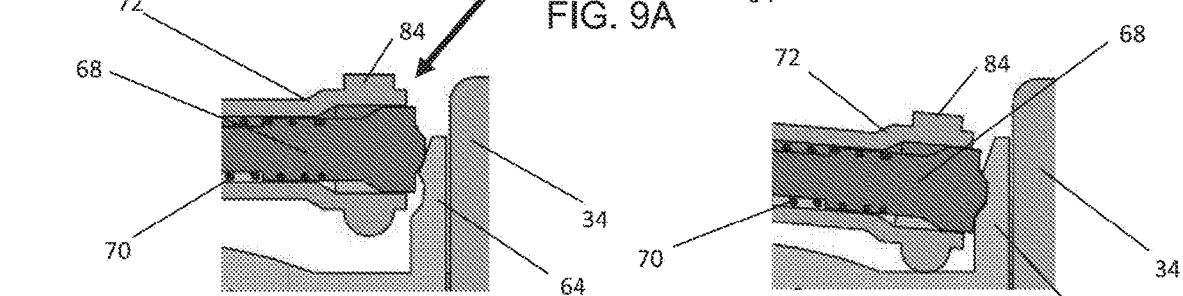
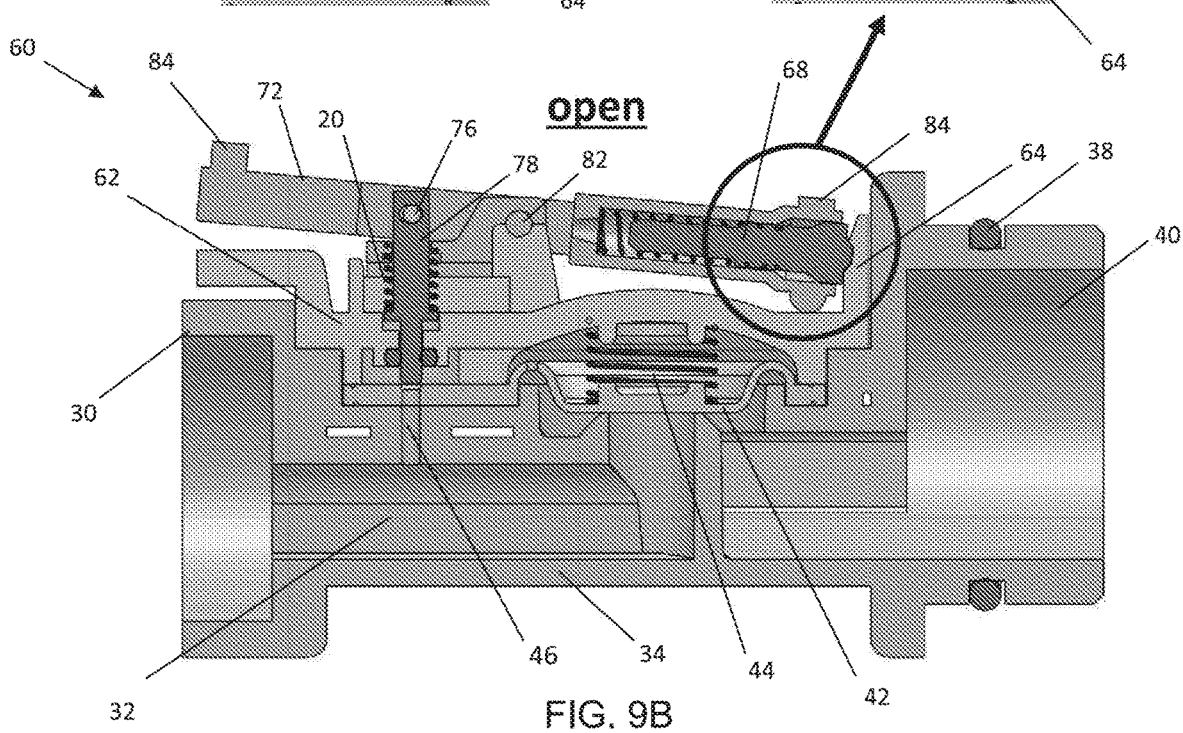
FIG. 9A
FIG. 9B

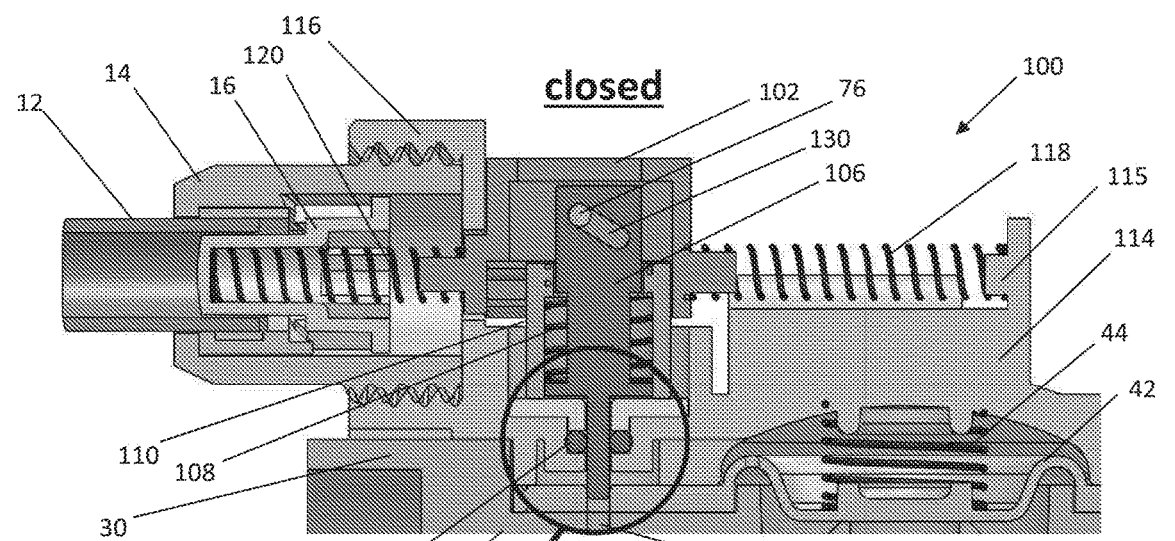
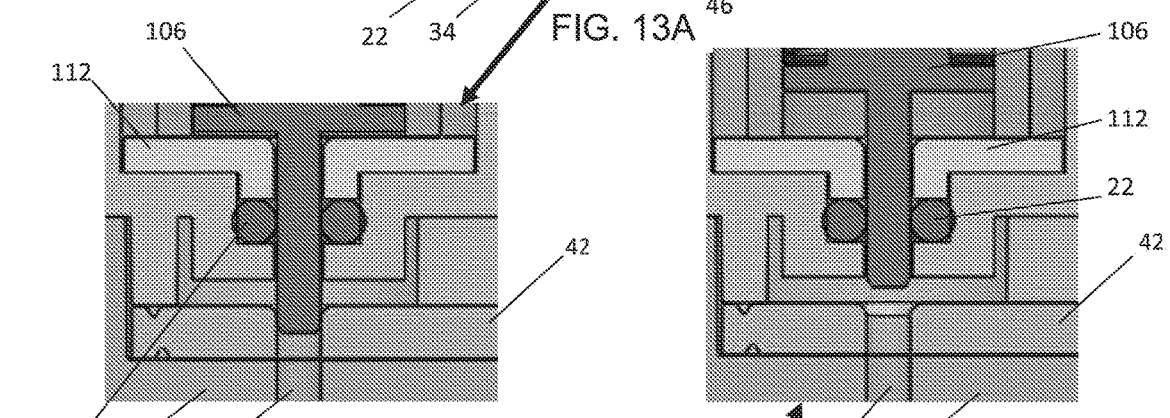
FIG. 13A
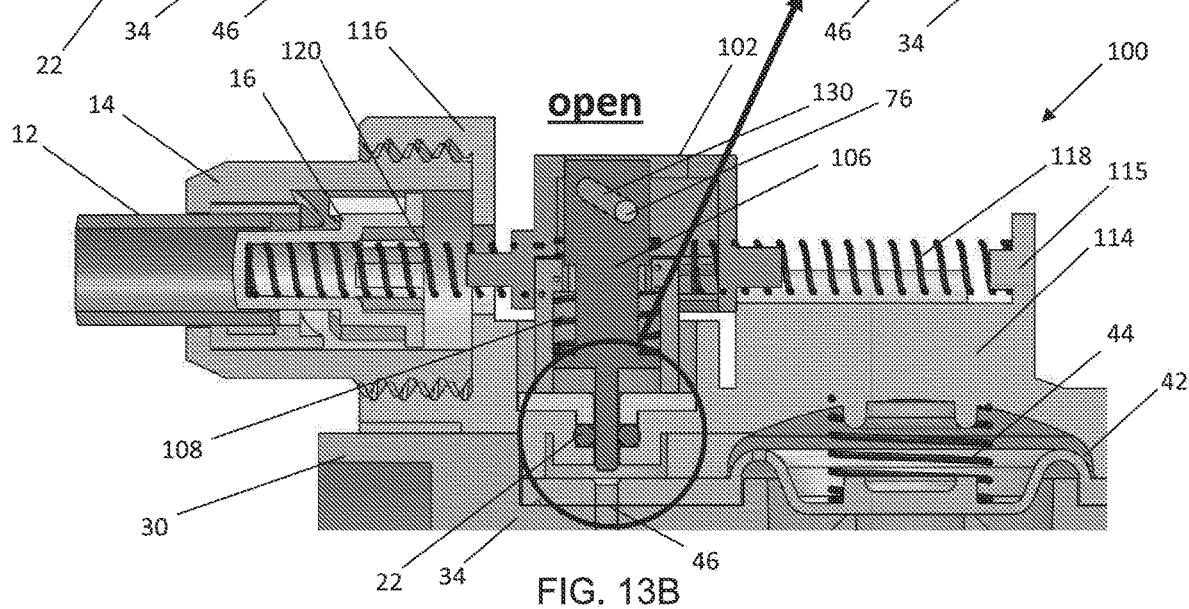
FIG. 13B

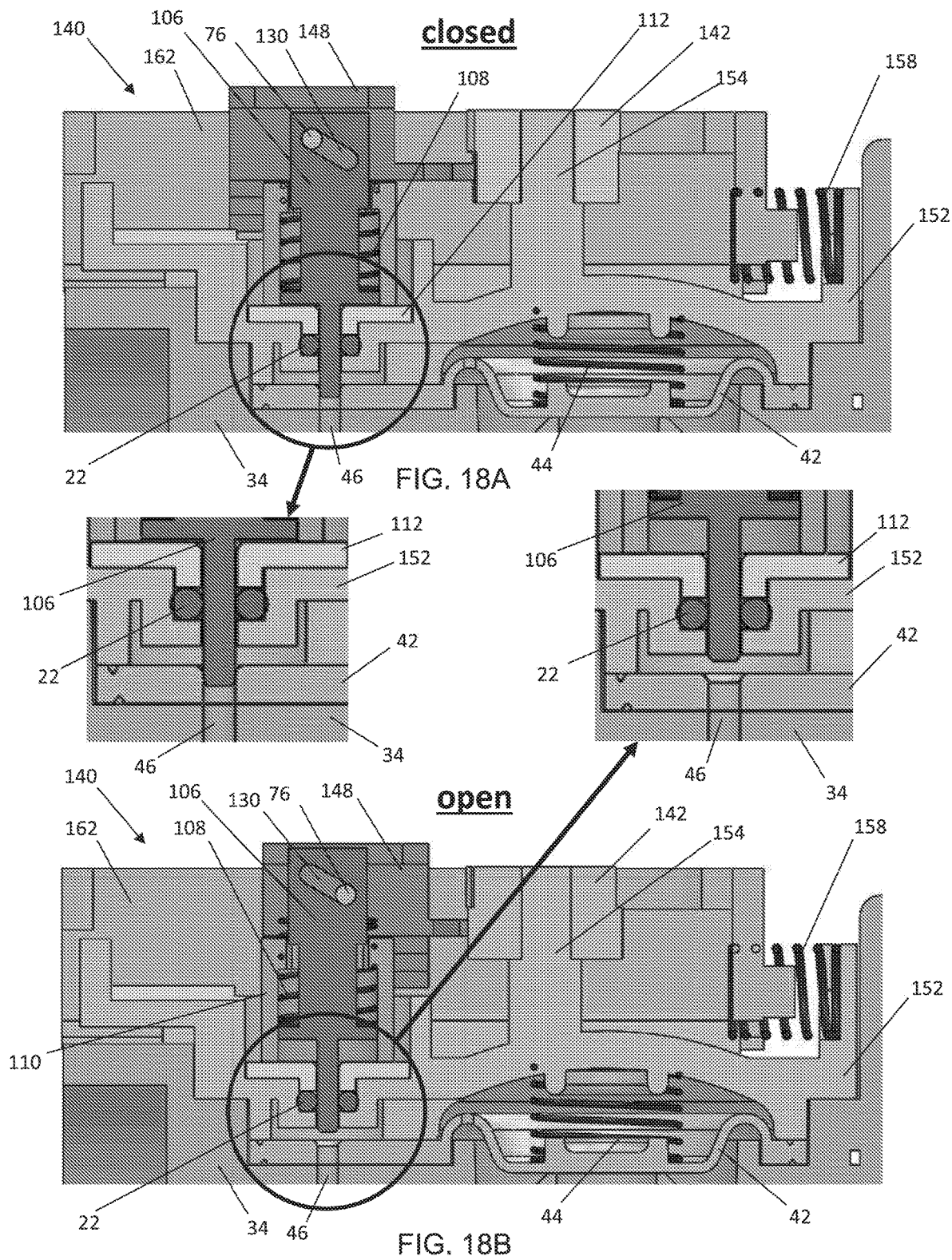

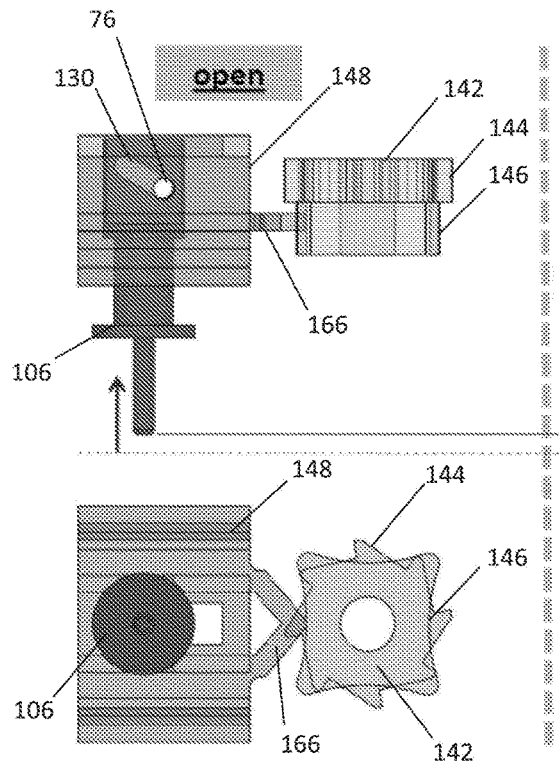
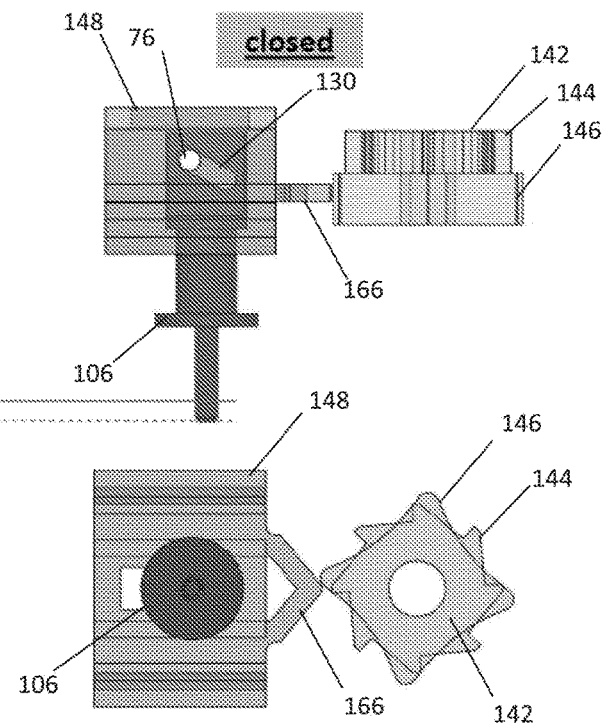
FIG. 19A
FIG. 19B
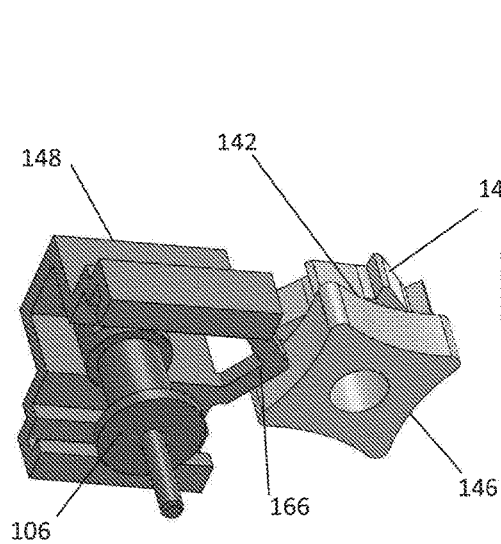
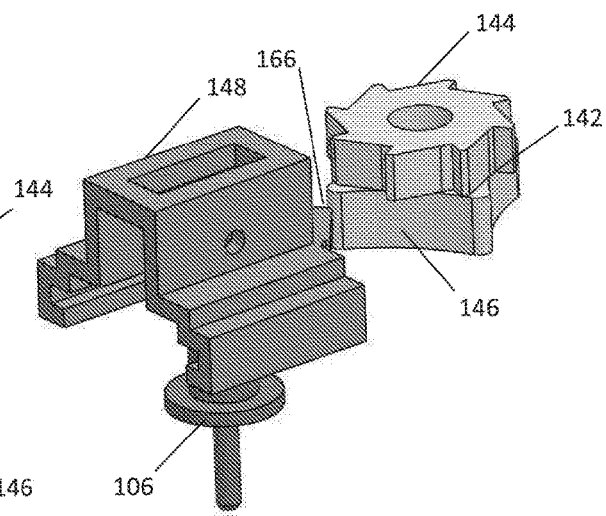
FIG. 20A
FIG. 20B

SWITCHING TECHNOLOGY FOR FAUCETS

CROSS-REFERENCE TO RELATED APPLICATION

This application claims priority of U.S. Provisional Patent Application Ser. No. 62/418,912 filed Nov. 8, 2016, which is incorporated herein by reference.

FIELD OF THE INVENTION

The present invention in general relates to fluid flow control devices and in particular, to flow control modules for mechanical touch faucets.

BACKGROUND OF THE INVENTION

Currently, touch faucets available on the market have an on/off switch that is either electronic or mechanically driven. Typically, the design of an electronic touch faucet includes a hydraulic valve and diaphragm controlled by a solenoid that is controlled by electronic circuitry sensitive to human touch to the faucet spout based on living tissue resistive or capacitive characteristics. The conventional touch faucet electronic circuitry provides commands to the system to either open the water flow or close the water flow with a pressurized water supply, while the temperature and flow of the electronic touch faucet remain controlled by a traditional mixing valve or set of valves. Mechanical touch faucets in the market are also based on a hydraulic valve and diaphragm though operated mechanically.

However, electronic touch faucets require an electrical power source such as batteries, or line power. The requisite power requirement and required electronics complicate the installation of the conventional touch faucet, and decrease the reliability of operation. Additionally, permit approvals are required for both plumbing and electrical inspectors. Furthermore, a loss of electrical power may interrupt the supply of water and in the case of battery power; period replacement represents an additional source of maintenance.

Thus, there exists a need for a mechanical touch faucet that provides the same operational benefits and features of an electronic faucet, but is driven by a mechanical assembly thus simplifying the system, eliminating the use of an electrical power supply, eliminating the need for electronic control circuitry, and simplifying installation while increasing long term operational reliability.

SUMMARY OF THE INVENTION

A switching module is provided for mechanical touch faucets. The switching module includes a modular control mechanism in mechanical communication with a valve assembly. The modular control mechanism includes a piston twist button which sits atop a piston and a piston return spring, a seal pin inserted into the piston with a seal pin return spring positioned between a base of the seal pin and a lower cavity of the piston, where the seal pin return spring is biased to push said seal pin downward toward the valve assembly. The valve assembly includes an input with an O-ring that seals the valve assembly to a set of internal walls of the faucet, a valve outlet, a valve cover that attaches to the modular push-pin mechanism, a diaphragm, and a diaphragm spring. The valve cover also serves as a diaphragm chamber cover that holds a top portion of the diaphragm spring while a lower portion of the diaphragm spring rests on the diaphragm. The valve assembly either allows fluid downstream to the valve outlet or shuts off the fluid flow from a pressurized fluid source in response to the position of the seal pin.

A touch faucet device is provided for coupling to a pressurized fluid supply. The touch faucet device includes a faucet with a depressible touch surface segment and an outlet, and a switching module as described above. The switching module is actuated by the touch surface, where the switching module induces fluid flow from the pressurized fluid supply through the outlet in response to a user depression of the touch surface segment.

A method for using the switching module as described above includes placing the switching module in a faucet assembly, and dispensing a fluid from a pressurized fluid supply by depressing a touch surface segment and actuating the modular control mechanism, where the modular control mechanism induces fluid flow from the pressurized fluid supply through the outlet in the device.

A touch faucet device is provided for coupling to a pressurized fluid supply. The touch faucet device includes a faucet with a rocker switch touch plate and an outlet, and a mechanical valve actuated by the rocker switch touch plate. The mechanical valve induces fluid flow from the pressurized fluid supply through the outlet in response to a user depression of the rocker switch.

BRIEF DESCRIPTION OF THE DRAWINGS

The present invention is further detailed with respect to the following drawings that are intended to show certain aspects of the present invention, but should not be construed as a limit on the practice of the present invention.

FIGS. 1A-1C are a series of perspective views of an inventive universal modular push-pin mechanism for an on-off valve;

FIGS. 9A and 9B are cross-sectioned views of the inventive rocker mechanism of FIGS. 6A and 6B in a closed and open position, respectively;

FIGS. 13A and 13B are cross-sectioned views of the inventive horizontal/perpendicular push mechanism of FIGS. 11A and 11B in a closed and open position, respectively;

FIGS. 18A and 18B are cross-sectioned views of the inventive horizontal/perpendicular push mechanism of FIGS. 15A and 15B in a closed and open position, respectively;

FIGS. 19A and 19B illustrate side and bottom views of the actuation of the ratchet and cam wheel pivot in response to the pushing of the inventive horizontal push mechanism of FIGS. 15A and 15B;

FIGS. 20A and 20B illustrate perspective views of the actuation of the ratchet and cam wheel pivot in response to the pushing of the inventive horizontal/perpendicular push mechanism of FIGS. 15A and 15B.

DESCRIPTION OF THE INVENTION

Figure 2:
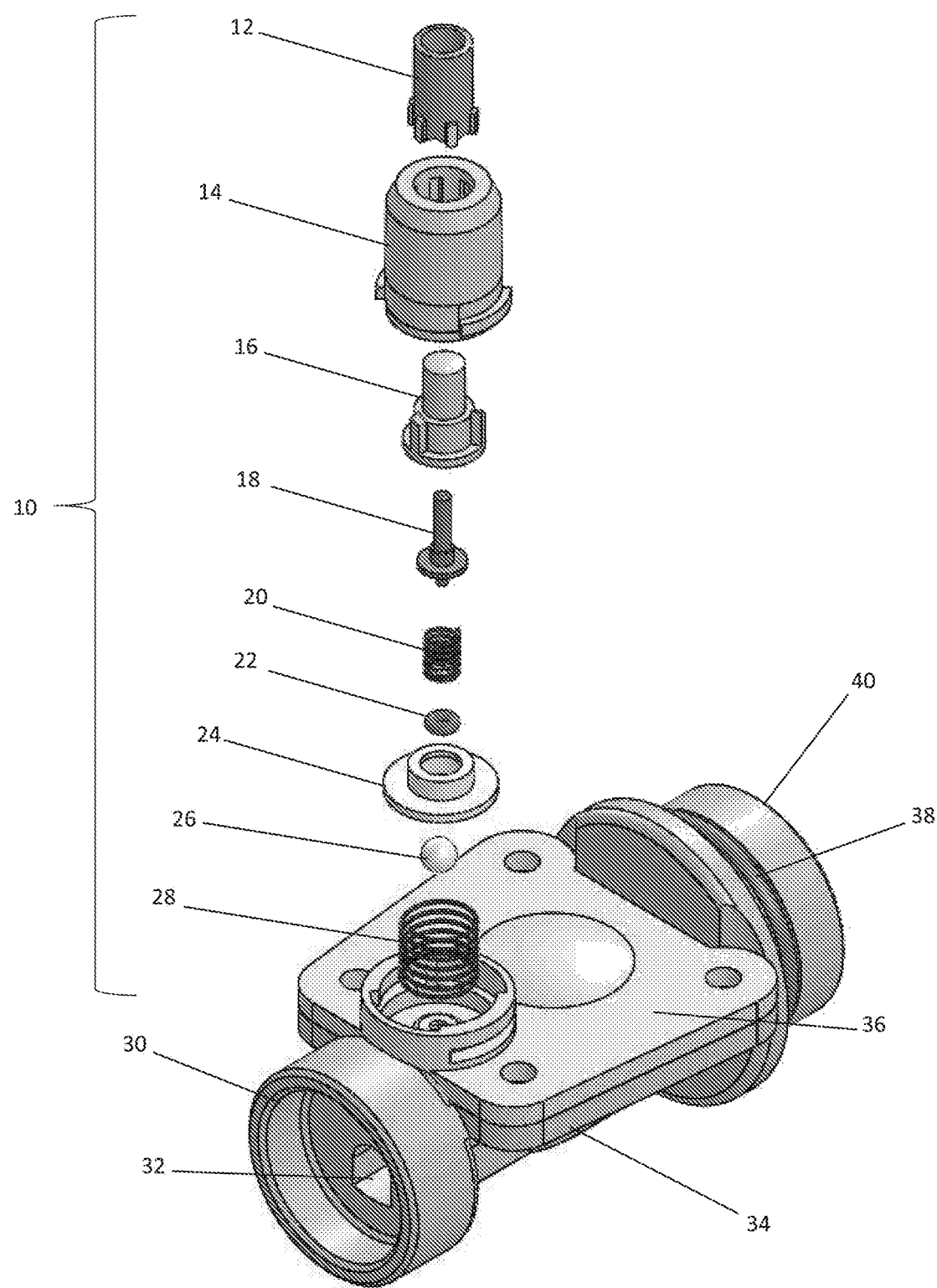
FIG. 2 is an exploded view of the inventive push button mechanism of FIGS. 1A-1C.

The present invention has utility as universal switching modules for mechanical touch faucets. Inventive universal switching modules for mechanical touch faucets afford the same operational benefits and features as an electronic faucet without the necessity of resort to an electrical power supply, eliminating the need for electronic control circuitry, and simplifying installation while increasing long term operational reliability.

Faucets employing embodiments of the inventive universal switching module are activated by a linear depressing or a rocking motion that contrasts with the rotary motion associated with rotating a valve stem. Embodiments of the inventive switching module designs are agnostic to the faucet design meaning that the switching modules are universal in that the modules fit any faucet design. Faucet manufacturers are able to purchase embodiments of the module based on the type of activation that they prefer and integrate in their own faucet design seamlessly. Embodiments of the inventive universal switching module work with a variety of activation methods used in faucet design illustratively including a rocker switch concept, a push concept, and horizontal/perpendicular push concept.

Unless noted to the contrary, components of an inventive faucet are formed of materials conventional to the art of plumbing fixture manufacture and in recognition that material compatibility is required for a given fluid flowing therethrough.

While the present invention is detailed herein with respect to the mechanically controlled flow of water, it is appreciated that an inventive faucet is suitable for delivery of aqueous solutions that illustratively include carbonated beverages, alcoholic drinks, medicaments, and juices; organic liquids; and other compositions flowable at temperatures compatible with the inventive faucet construction. As used herein, the term "water" should be treated as being synonymous with a generic liquid fluid.

Referring now to FIGS. 1A-1C a series of perspective views of an inventive universal modular push-pin mechanism 10 for an on-off valve are shown. Fluid flows into diaphragm and hydraulic valve assembly 34 at input 40, where a large O-ring 38 acts to seal the hydraulic valve assembly 34 to the internal walls of a faucet, and fluid exits via channel 32 at valve outlet 30. The modular push-pin mechanism 10 attaches to valve cover 36 with a push-push mechanical body housing 14. The push-push mechanism body 14 holds and guides the piston twist button 14 that controls the fluid flow through the hydraulic valve assembly 34. The operation and components of the modular push-pin mechanism 10 will be described in greater detail below with like numerals used between various figures intended to have like meaning.

Figure 3:
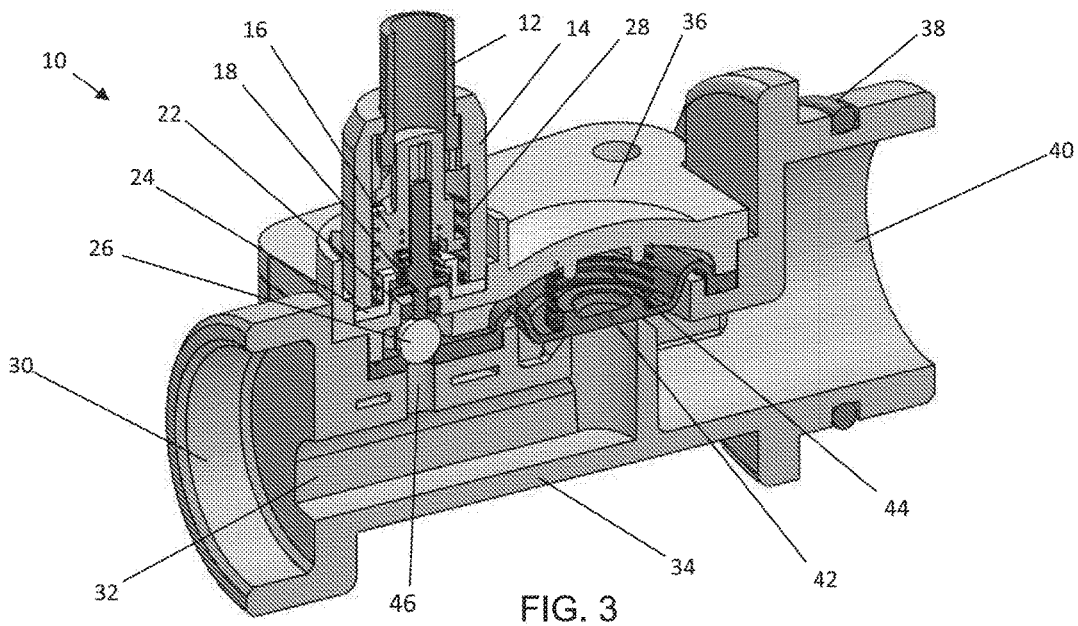
FIG. 3 is a cross-sectioned view of the inventive push button mechanism of FIGS. 1A-1C.

FIG. 2 is an exploded view of the inventive push button mechanism 10. The push button mechanism 10 houses the piston twist button 12 which sits atop the piston 16 and the piston return spring 28. A seal pin 18 inserts into piston 16 with a seal pin return spring 20 positioned between the base of the seal pin 18 and the lower cavity of the piston 16. The seal pin return spring 20 is biased to push the seal pin 18 downward toward the valve assembly 34. An O-ring 22 sits in a seal cap 24 above a seal ball 26. The relationship between the components of the push button mechanism 10 is shown in the cross-sectional view of FIG. 3. Also, shown in FIG. 3 is the diaphragm 42 and diaphragm spring 44. The valve cover 36 also serves as a diaphragm chamber cover that holds the top portion of the diaphragm spring 44 while the lower portion of the diaphragm spring 44 rests on the diaphragm 42. The hydraulic valve assembly 34 with a diaphragm 42 either allows water to go downstream to the valve outlet 30 or shuts off the water flow from the pressurized fluid source.

The inventive hydraulic valve sub assembly 34, unlike those presently found in hydraulic valves used in irrigation and garden irrigation systems, is controlled mechanically and does not use a solenoid to actuate the valve. Through the user touch induced depression, a translation of a portion of the assembly 34 results in a preselected travel of the assembly 34, and water flow is modified through the assembly 34.

Figures 4A, 4B:
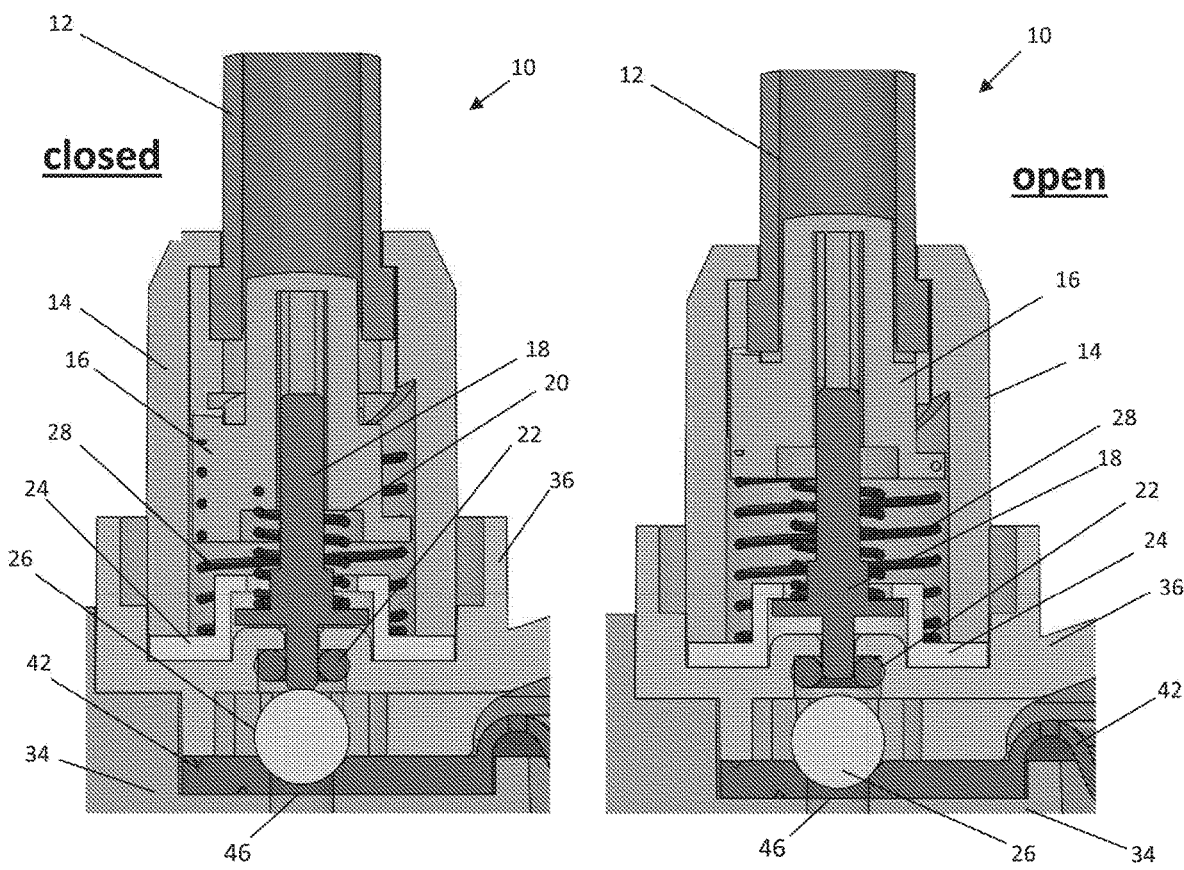
FIGS. 4A and 4B are cross-sectioned views of the inventive push button mechanism of FIGS. 1A-1C in a closed and open position, respectively.

FIGS. 4A and 4B are cross-sectioned views of the inventive push button mechanism in a closed and open position, respectively. In FIG. 4A the closed position is shown where the push piston 16 is pressed down strong enough over the seal pin return spring 20, allowing the seal pin 18 to push down the seal ball 26 onto the diaphragm 42 and block channel 46 that extends through the diaphragm 42 and valve body 34. In FIG. 4B the open position is shown where the push piston 16 relives pressure over the seal pin return spring 20, allowing the seal pin 18 to lift from the seal ball 26.

Figure 5:
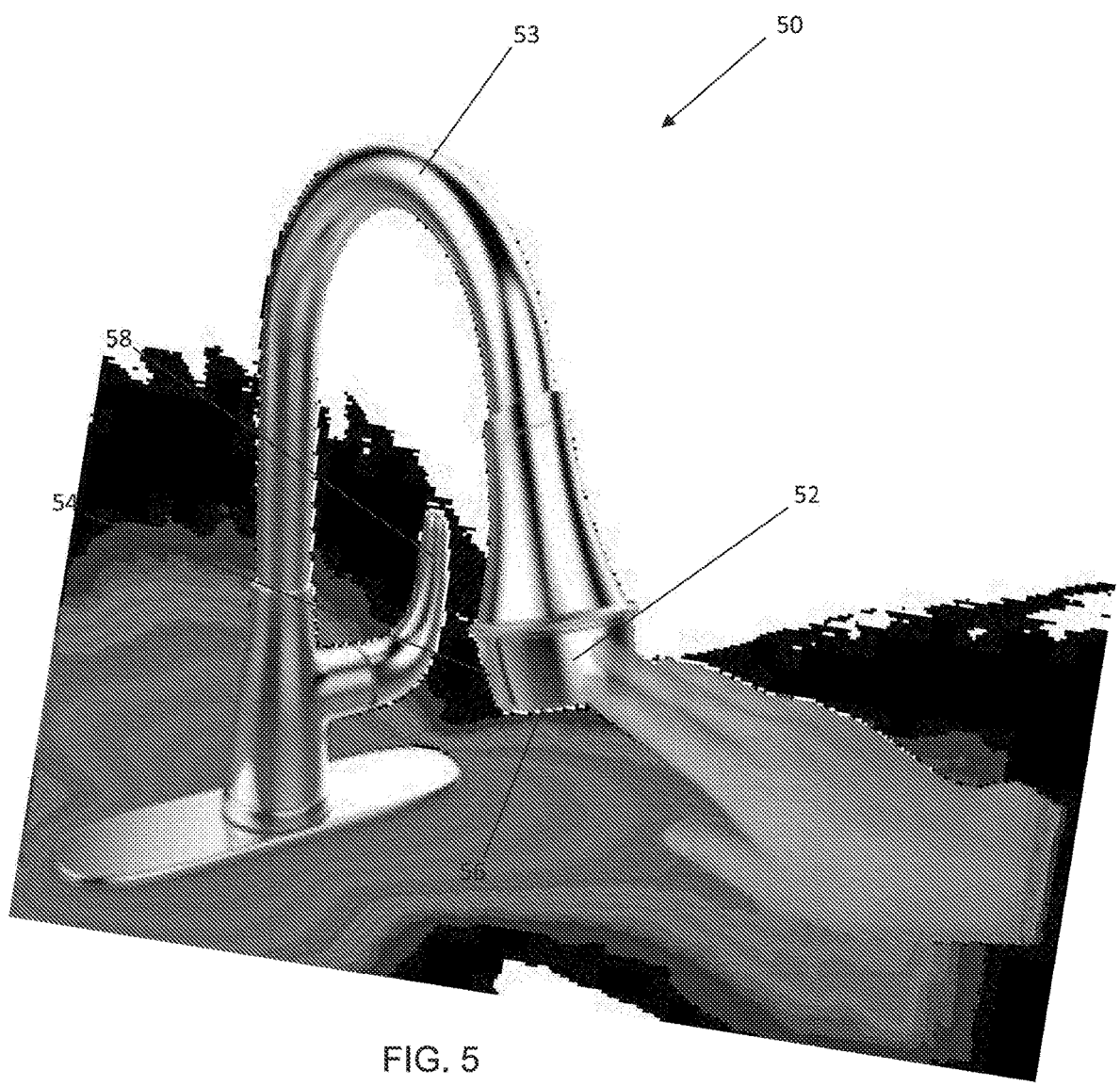
FIG. 5 is a pictorial view of a faucet design employing a push button to actuate the underlying inventive push button mechanism of FIGS. 1A-1C.

FIG. 5 shows a faucet design shown generally at 50 employing the underlying inventive push button mechanism 10, and characterized by having a neck region 53, a spout 54, and fluid outlet 56 with a large touch surface segment 52. It is appreciated that the neck region 53 need not have a bend relative to the downstream portion as determined relative to a pressurized water supply (not shown) that is in fluid communication with the faucet 50. The touch surface segment 52 while depicted at the spout 54 is appreciated to be amenable to be positioned anywhere on the faucet 50 to which a user has touch access. The faucet 50 may have an outer surface that is made of chrome plated materials, stainless steel, metals, plastics, composite materials, and combinations thereof; and in contrast to the conventional touch faucet need not be electrically conductive. In operation, a user depresses the touch surface segment 52 through a pre-defined travel distance to open the water or fluid flow and once again to close the water or fluid flow. In the embodiment depicted, each single touch of the surface segment 12 that initiates the pre-selected travel either opens or closes the water flow from the pressurized fluid supply. It is appreciated that a stepped touch surface can allow partial opening of the water flow with each successive user touch; by way of example, a first touch induces a partially open water flow, a second touch initiates complete opening of the water flow, and a third touch terminates the water flow.

The water temperature and flow rate in this embodiment are controlled by a traditional mixing valve 58. It is appreciated that in other embodiments of the inventive touch faucet may lack a mixing valve 58, and may simply dispense water at a single rate and single temperature.

Figure 6A:
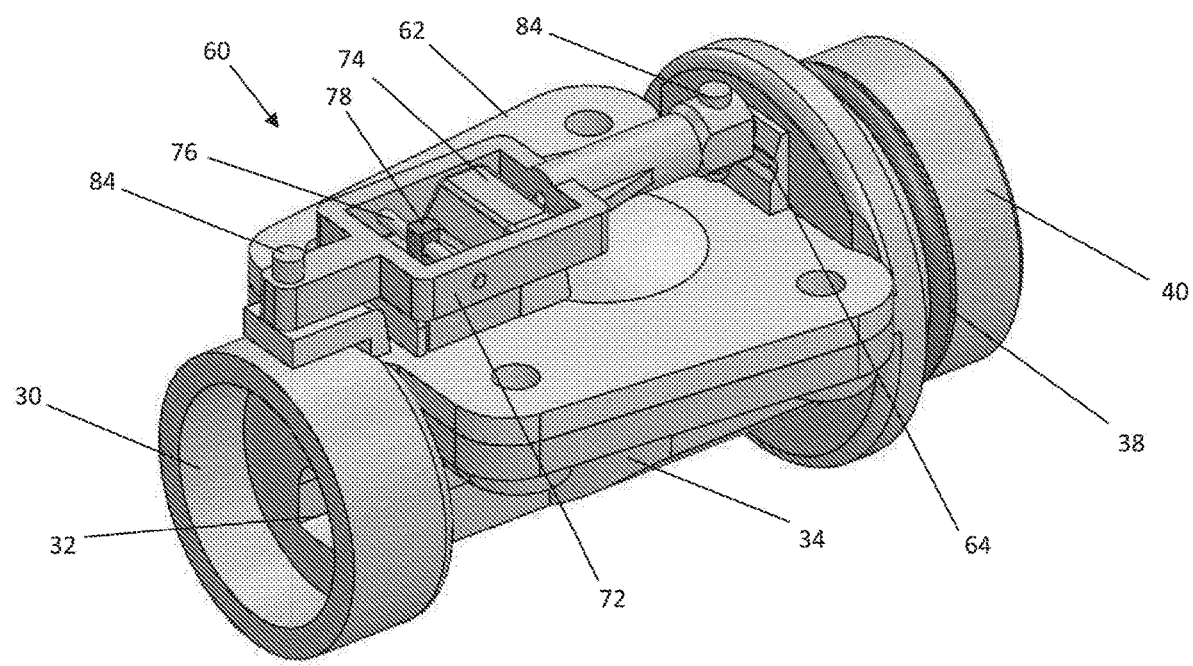
FIGS. 6A and 6B are a series of perspective views of an inventive universal modular rocker mechanism for an on-off valve.
Figure 6B:
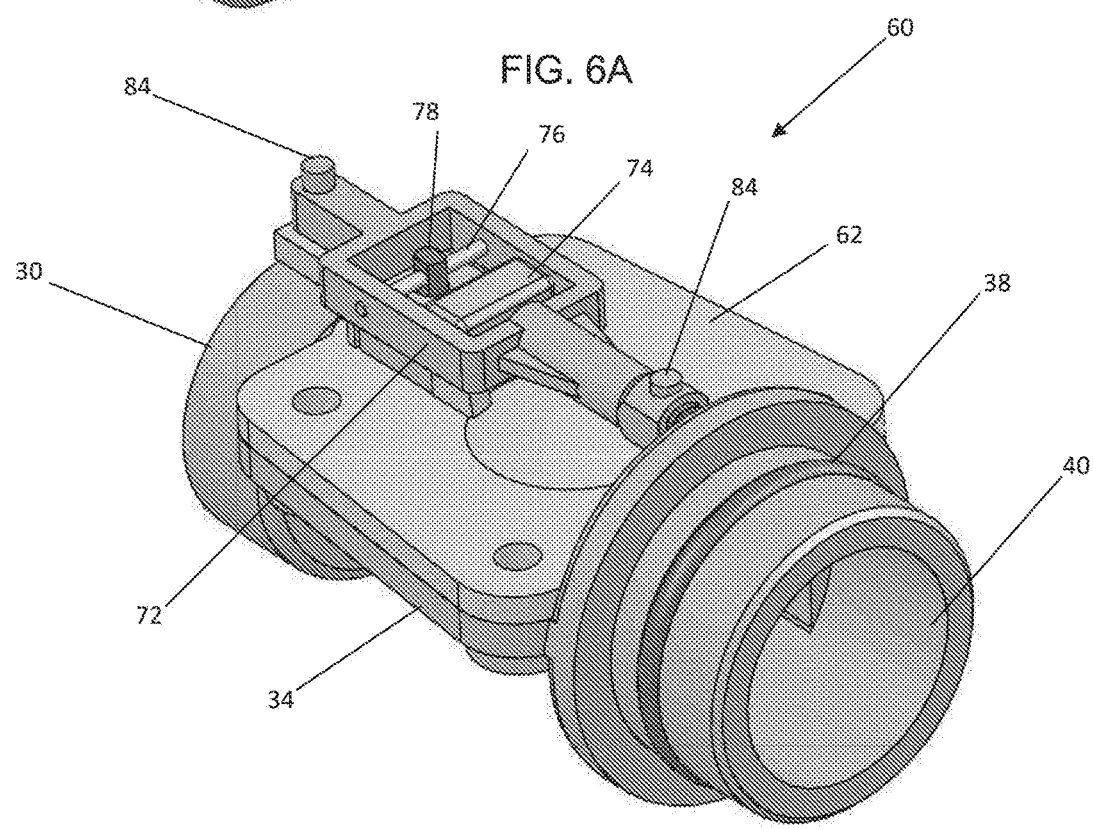

FIGS. 6A and 6B are a series of perspective views of an inventive universal modular rocker mechanism 60 for the hydraulic valve sub assembly 34. The modular rocker mechanism 60 attaches to valve cover 62 via lever pivot lock 74. The lever pivot lock 74 holds and allows the rocker lever 72 to have a pivot action that controls the fluid flow through the hydraulic valve assembly 34. The operation and components of the rocker mechanism 60 will be described in greater detail below with like numerals used between various figures intended to have like meaning.

Figure 7:
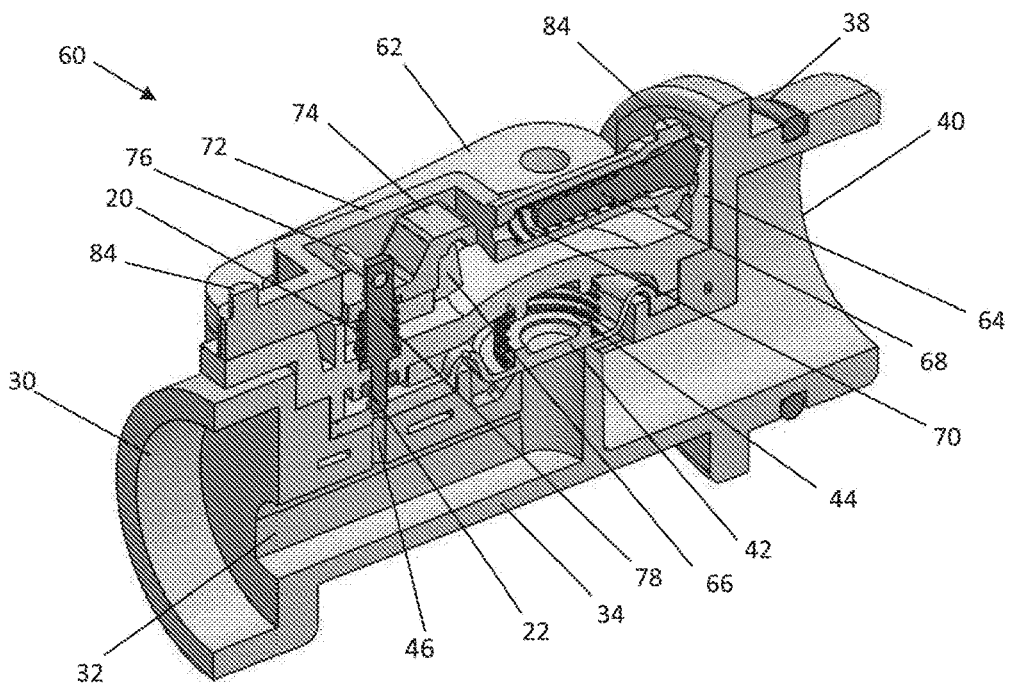
FIG. 7 is a cross-sectioned view of the inventive rocker mechanism of FIGS. 6A and 6B.
Figure 8:
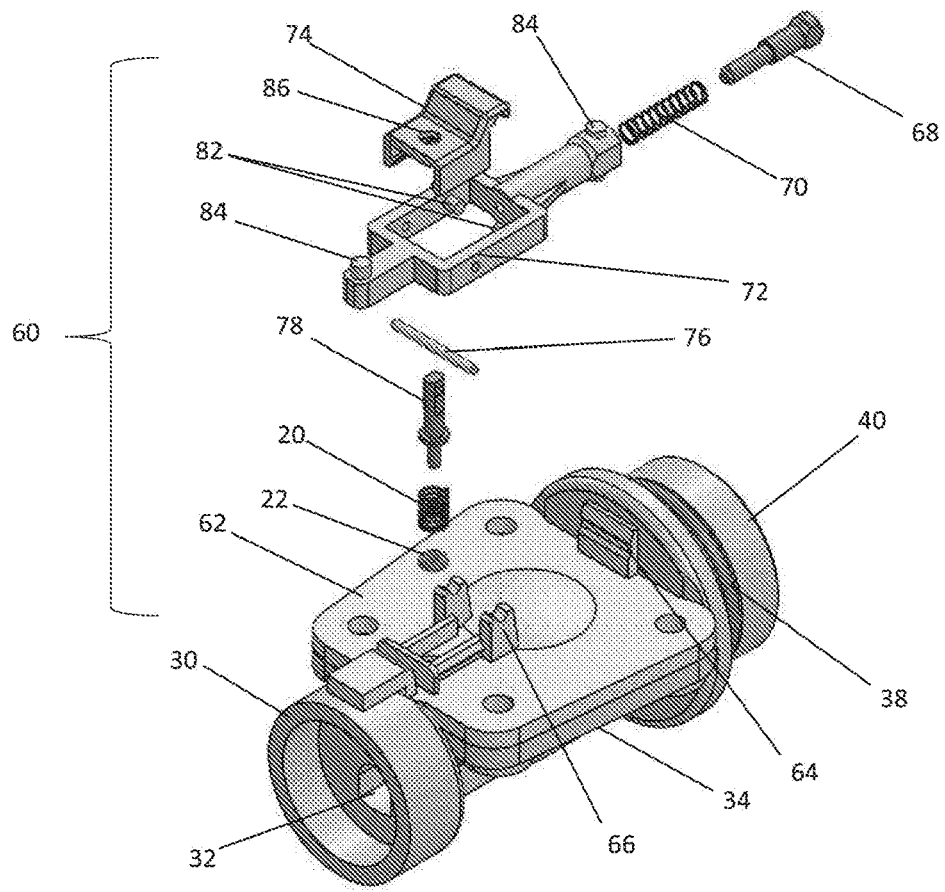
FIG. 8 is an exploded view of the inventive rocker mechanism of FIGS. 6A and 6B.

FIG. 8 is an exploded view of the inventive rocker mechanism 60. The rocker lever 72 has a set of opposing stubs 82 that rest in a lever pivot cradle 66 that extends upward from the valve cover 62. The lever pivot lock 74 secures the stubs 82 to the lever pivot cradle 66. A seal pin cam pivot 76 provides a pivoting connection between seal pin 78 and the rocker lever 72. The seal pin 78 inserts through an aperture 86 in the lever pivot lock 74 and sits on a seal pin return spring 20 that rests on the valve cover 62. The tip of the seal pin 78 extends through an aperture in the valve cover 62 and an O-ring 22 below the aperture that provides a water tight seal about the seal pin 78. A notch rod 68 loaded on a notch rod return spring 70 extends from the distal end of the rocker lever 72. The notch rod 68 interacts with notch 64. Lever activation points 84 extend upward from both the proximal and distal ends of the rocker lever 72 and serve as connection points to a touch surface on a faucet that employs the universal modular rocker mechanism 60. FIG. 7 is a cross-sectional view that shows the relationship between the rocker mechanism 60 to the hydraulic valve sub assembly 34.

FIGS. 9A and 9B are cross-sectioned views of the inventive rocker mechanism 60 in a closed and open position, respectively. In FIG. 9A the closed position is shown where the proximal end (left side in figure) of rocker lever 72 is pressed down strong enough to overcome the upward force of the seal pin return spring 20, allowing the seal pin 78 to push down into the diaphragm 42 and block channel 46 that extends through the diaphragm 42 and valve body 34. In FIG. 4B the open position is shown where the distal end (right side in figure) of rocker lever 72 is pressed down thereby lifting the seal pin 78 from the channel 46 in the diaphragm 42 and valve body 34. When the distal end of the rocker lever 72 is depressed the notch rod 68 engages notch 64 to provide a clicking action or sensation that also serve to lock the valve 34 in the open position. Spring force exerted by the notch rod return spring 70 may be adjusted to control the amount of pressure required to depress the rocker lever 72. The amount of travel that the rocker lever 72 is required to be depressed before locking may be adjusted by adjusting the notch profile to determine click in/out angle. The shape of the groove 64 and the amount of protrusion of the notch rod 68 may also be used to determine depression forces for engaging and disengaging the rocker lever 72.

Figure 10:
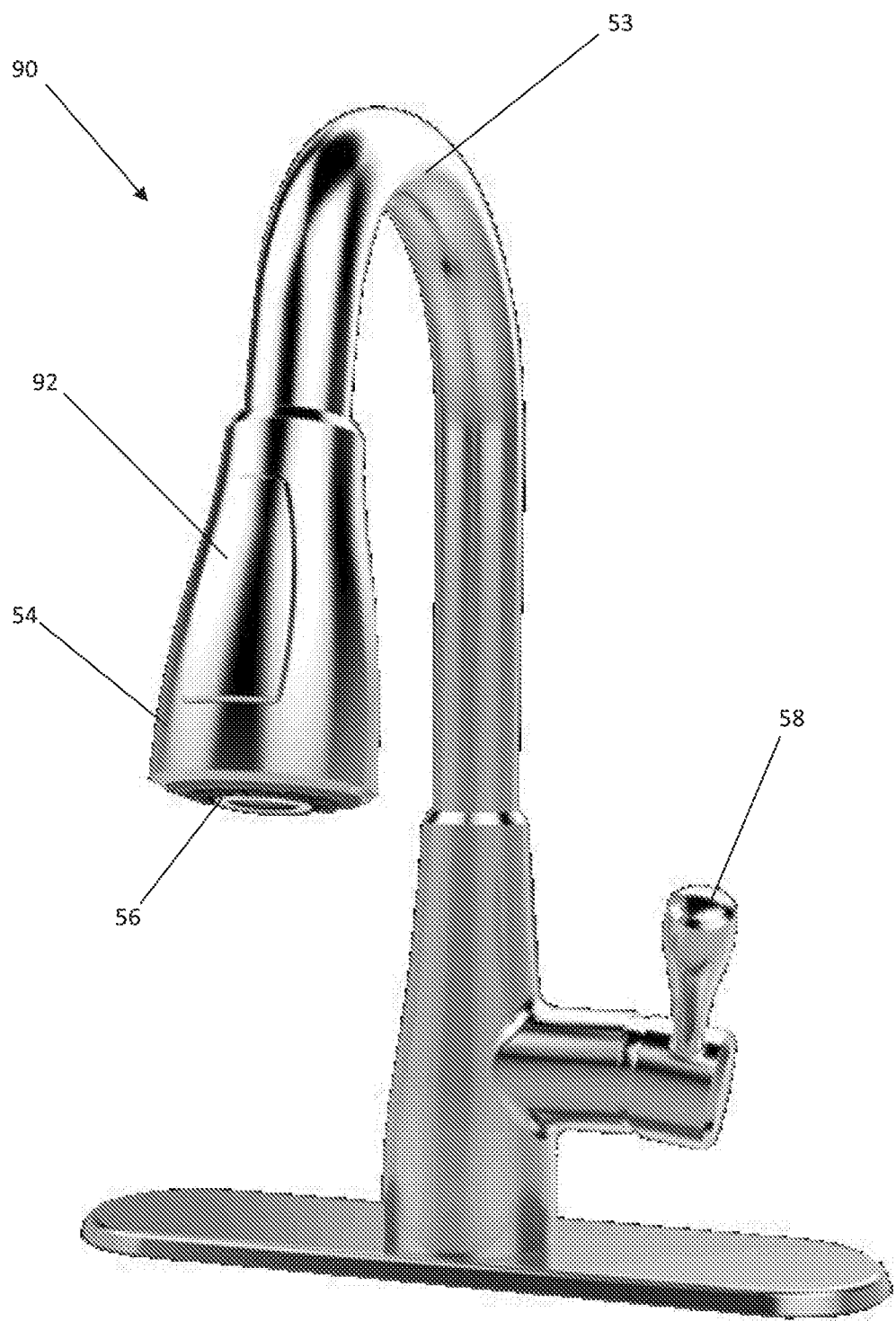
FIG. 10 is a pictorial view of a faucet design employing a push button to actuate the underlying inventive rocker mechanism of FIGS. 6A and 6B.

FIG. 10 shows a faucet design shown generally at 90 employing the underlying inventive rocker mechanism 60, and characterized by having a neck region 53, a spout 54, and fluid outlet 56 with a large rocker touch surface segment 92. It is appreciated that the neck region 53 need not have a bend relative to the downstream portion as determined relative to a pressurized water supply (not shown) that is in fluid communication with the faucet 90. The rocker touch surface segment 92 while depicted at the spout 54 is appreciated to be amenable to be positioned anywhere on the faucet 90 to which a user has touch access. The faucet 90 may have an outer surface that is made of chrome plated materials, stainless steel, metals, plastics, composite materials, and combinations thereof; and in contrast to the conventional touch faucet need not be electrically conductive. In operation, a user depresses the touch rocker surface segment 92 through a pre-defined travel distance on one end side of the surface 92 to open the water or fluid flow and once again on an opposing end side of the surface 92 to close the water or fluid flow. In the embodiment depicted, the surface 92 locks in a depressed position for continuous water flow from the pressurized fluid supply until the opposing side is pressed to close the water flow.

The water temperature and flow rate in this embodiment are controlled by a traditional mixing valve 58. It is appreciated that in other embodiments of the inventive touch faucet may lack a mixing valve 58, and may simply dispense water at a single rate and single temperature.

Figure 11A:
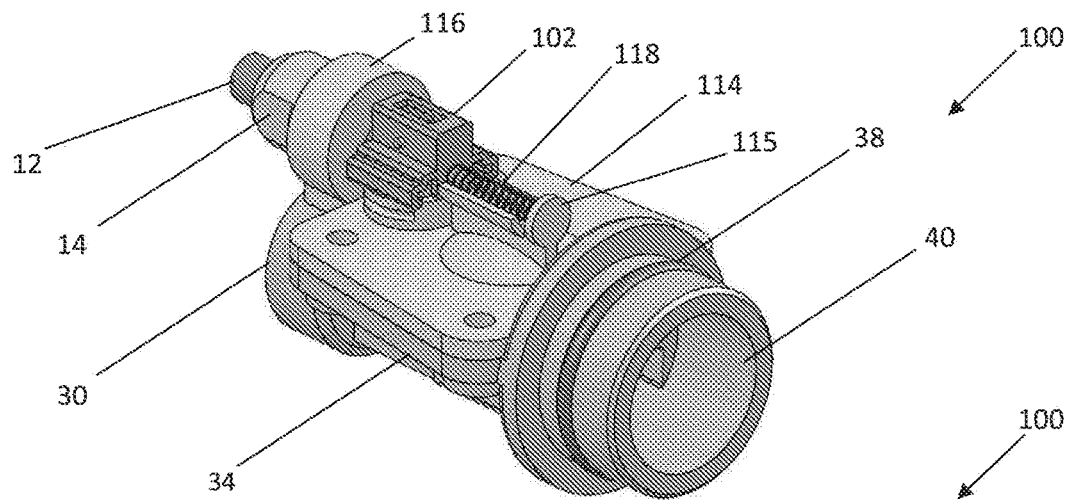
FIGS. 11A and 11B are a series of perspective views of an embodiment of an inventive universal modular horizontal/perpendicular push mechanism for an on-off valve.
Figure 11B:
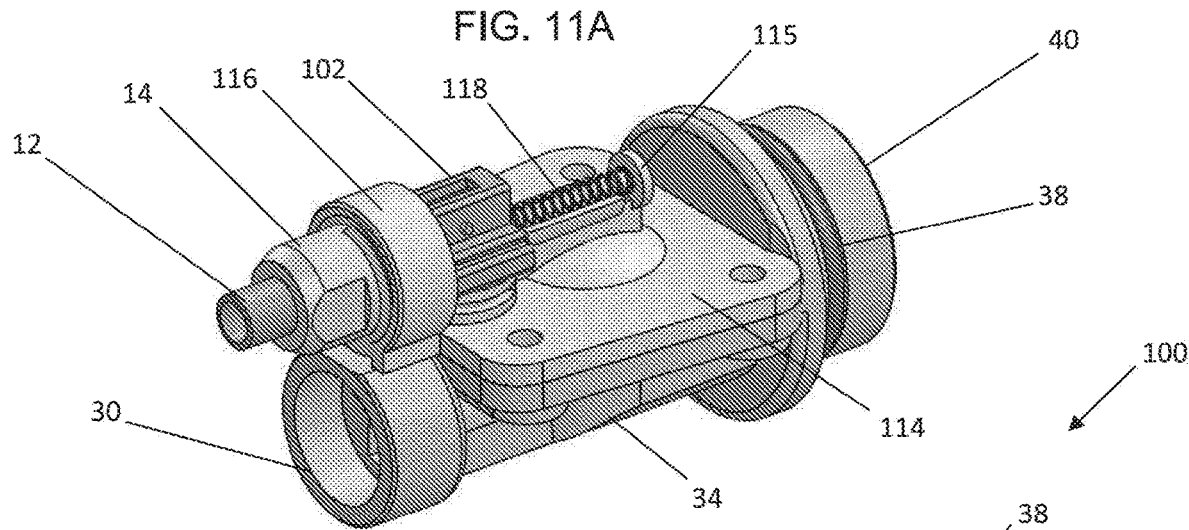

FIGS. 11A and 11B are a series of perspective views of an embodiment of an inventive universal modular horizontal/perpendicular push mechanism 100 for an on-off valve 34. The horizontal push mechanism 100 attaches to valve cover 114. The operation and components of the horizontal push mechanism 100 will be described in greater detail below with like numerals used between various figures intended to have like meaning.

Figure 12:
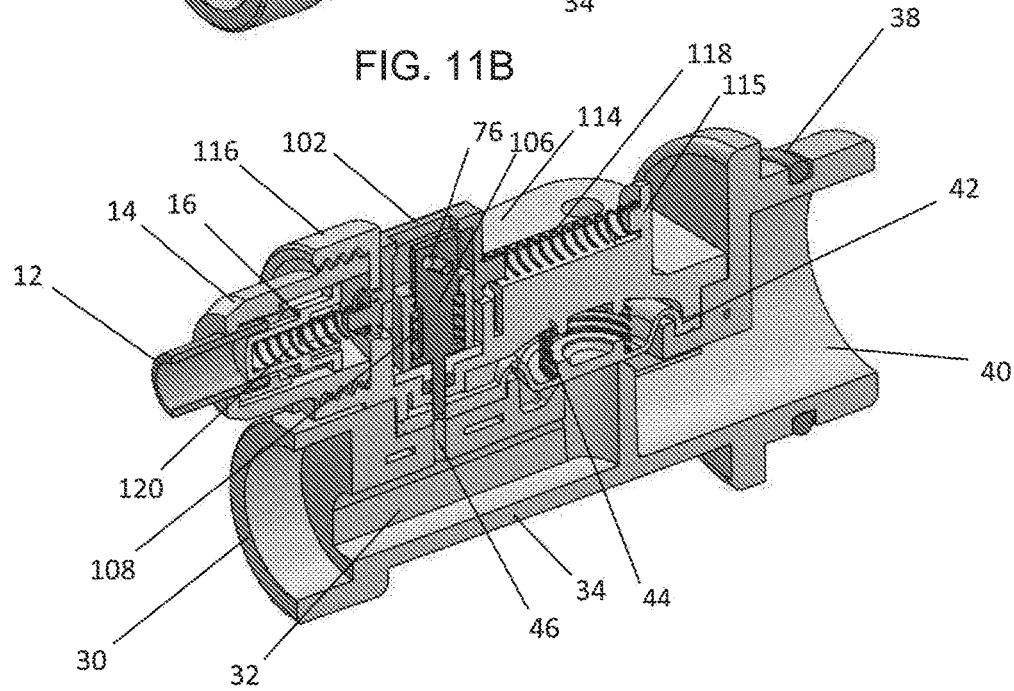
FIG. 12 is a cross-sectioned view of the inventive horizontal/perpendicular push mechanism of FIGS. 11A and 11B.
Figure 14:
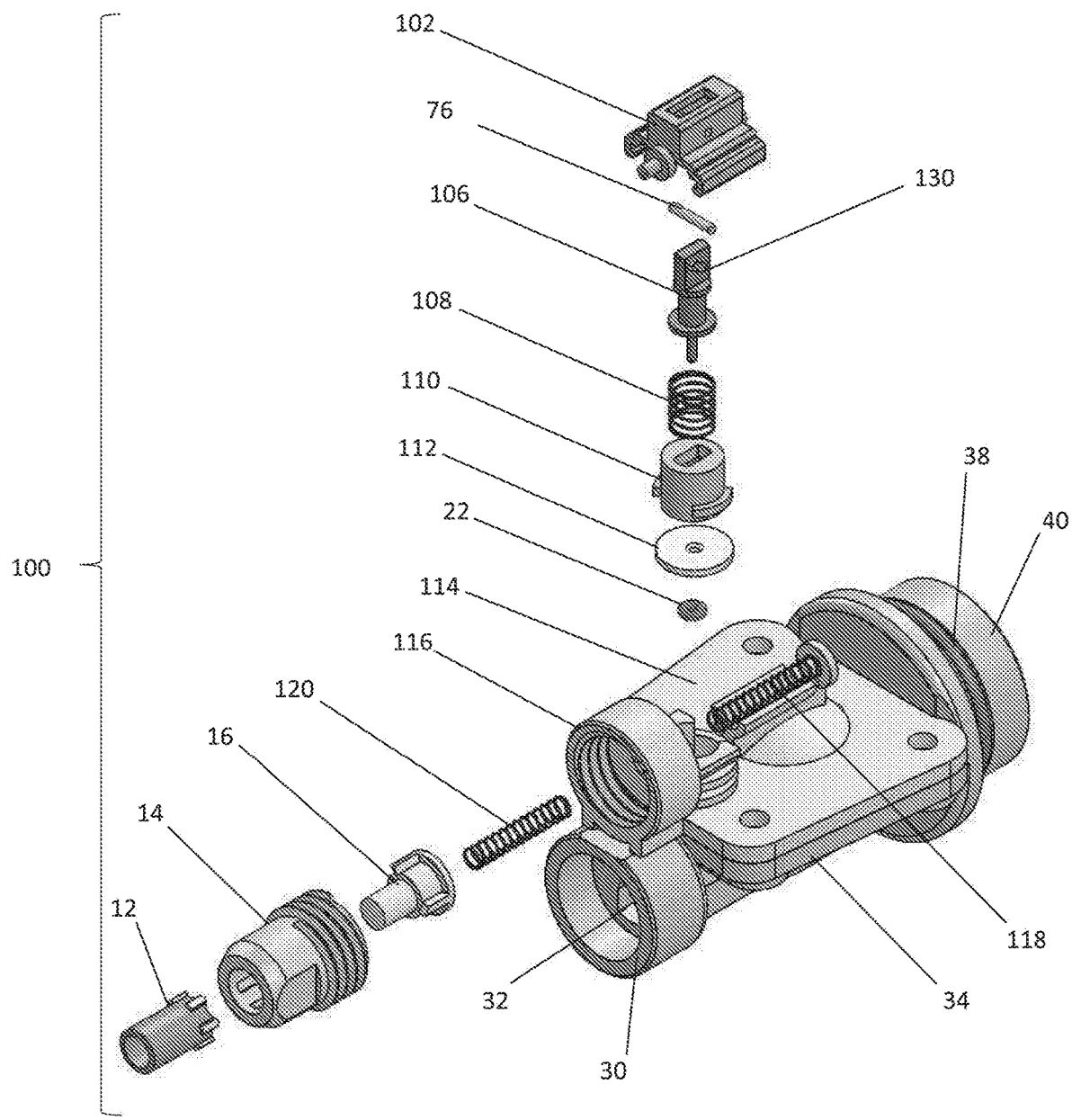
FIG. 14 is an exploded view of the inventive horizontal/perpendicular push mechanism of FIGS. 11A and 11B.

FIG. 14 is an exploded view of the inventive perpendicular push mechanism 100. The perpendicular push mechanism 100 houses the piston twist button 12 which sits atop the piston 16 and trolley press and release spring 120 and are contained in the push-push mechanism body 14 that screws on to threaded holder 116 that is part of the valve cover 114. A trolley 102 contacts release spring 120 and a trolley return spring 118 moves back and forth in response to depression of piston twist button 12 to actuate the seal pin 106 up and down. The trolley return spring 118 is secured to the valve cover 114 by stop 115. The trolley press and release spring 120 should be strong enough (when compressed by the piston 16) to overtake the trolley return spring 118 and force the trolley 102 to lift the seal pin 106. A seal pin cam pivot 76 in the trolley 102 rides in a slanted slot 130 in the seal pin 106 which causes the up and down action of the seal pin 106. The seal pin 106 is biased by a seal pin return spring 108 which are housed in a seal pin housing 110 that sits on a seal cap 112 and an O-ring 22. The tip of the seal pin extends through and travels through the seal cap 112 and the O-ring 22. The relationship between the components of the horizontal push mechanism 100 is shown in the cross-sectional view of FIG. 12. Also, shown in FIG. 12 is the diaphragm 42 and diaphragm spring 44. The valve cover 114 also serves as a diaphragm chamber cover that holds the top portion of the diaphragm spring 44 while the lower portion of the diaphragm spring 44 rests on the diaphragm 42. The hydraulic valve assembly 34 with a diaphragm 42 either allows water to go downstream to the valve outlet 30 or shuts off the water flow from the pressurized fluid source.

FIGS. 13A and 13B are cross-sectioned views of the inventive perpendicular horizontal push mechanism of FIGS. 11A and 11B in a closed and open position, respectively. As shown in FIG. 13A with the piston 16 in an outward position (the piston twist button 12 not pressed in) the seal pin return spring 108 biases the seal pin 106 downward into the diaphragm 42 and blocks channel 46 that extends through the diaphragm 42 and valve body 34. In FIG. 13B with the piston 16 pushed inward the seal pin cam pivot 76 in the trolley 102 rides in a slanted slot 130 (to the right in FIG. 13B) and raises the seal pin 106 upward and out of the diaphragm 42 and out of the channel 46 that extends through the diaphragm 42 and valve body 34.

Figure 15A:
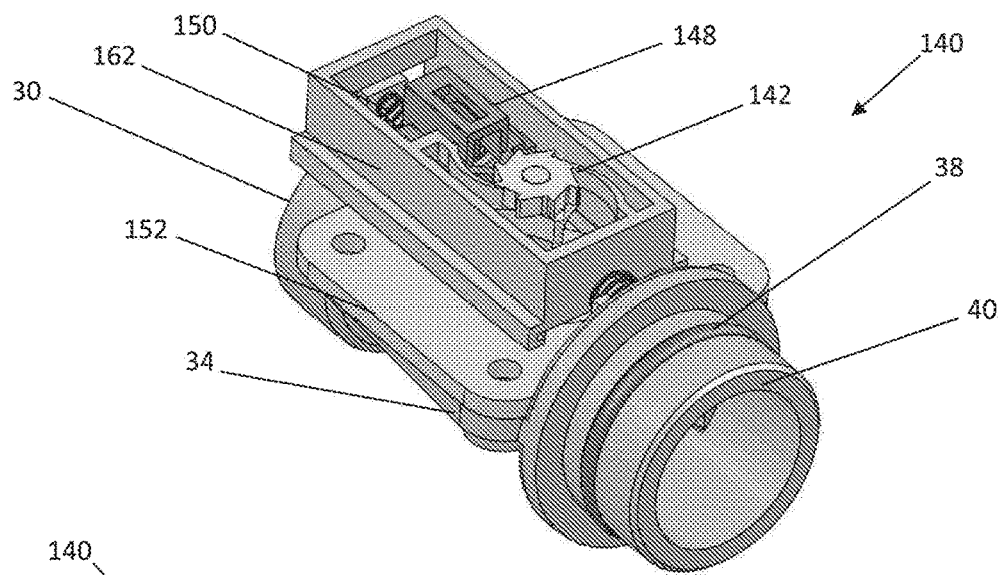
FIGS. 15A and 15B are a series of perspective views of an embodiment of an inventive universal modular horizontal/perpendicular push mechanism for an on-off valve.
Figure 15B:
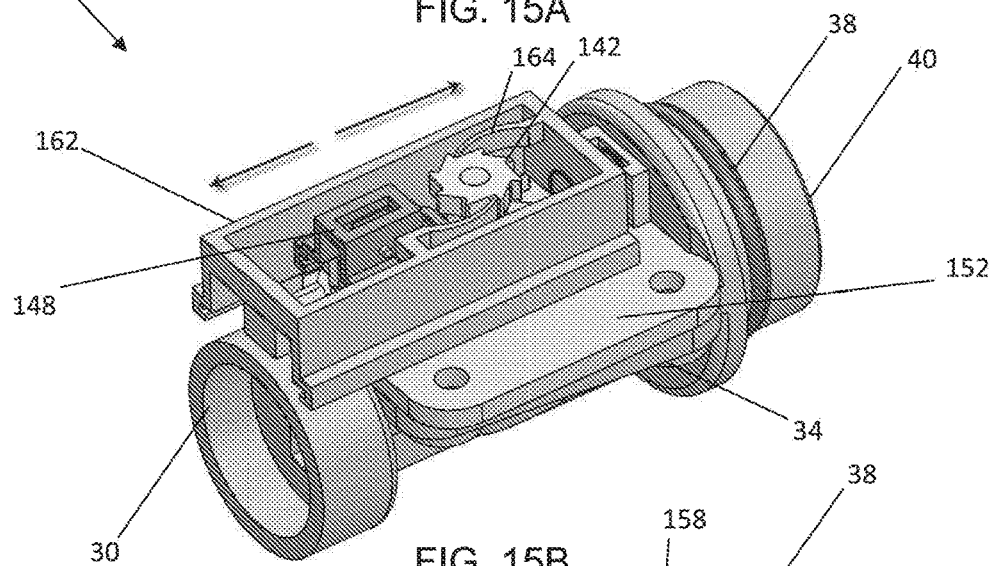

FIGS. 15A and 15B are a series of perspective views of an embodiment of an inventive universal modular horizontal/perpendicular push mechanism 140 for an on-off valve 34. The horizontal/perpendicular push mechanism 140 attaches to valve cover 152. The operation and components of the horizontal/perpendicular push mechanism 140 will be described in greater detail below with like numerals used between various figures intended to have like meaning.

Figure 16:
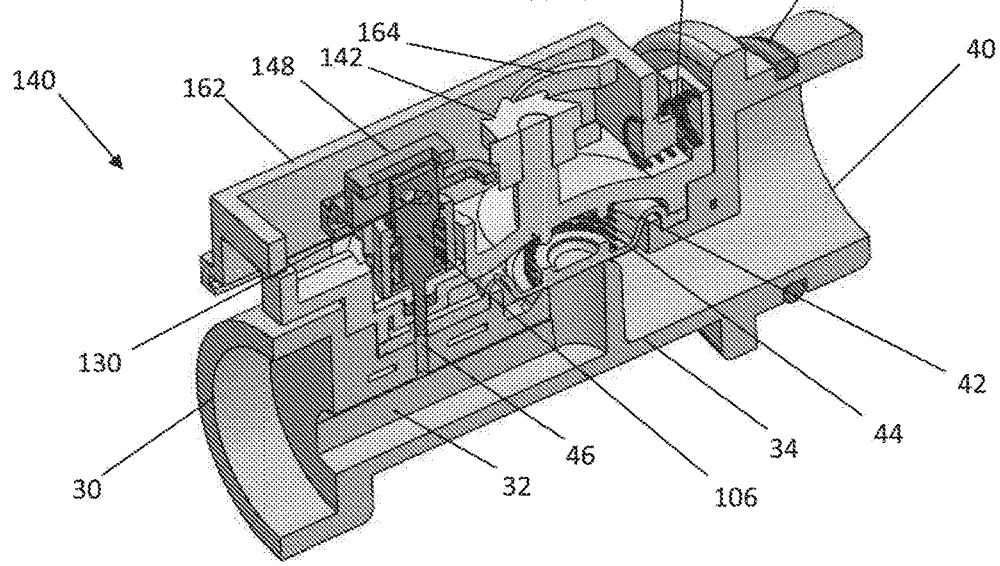
FIG. 16 is a cross-sectioned view of the inventive horizontal/perpendicular push mechanism of FIGS. 15A and 15B.
Figure 17:
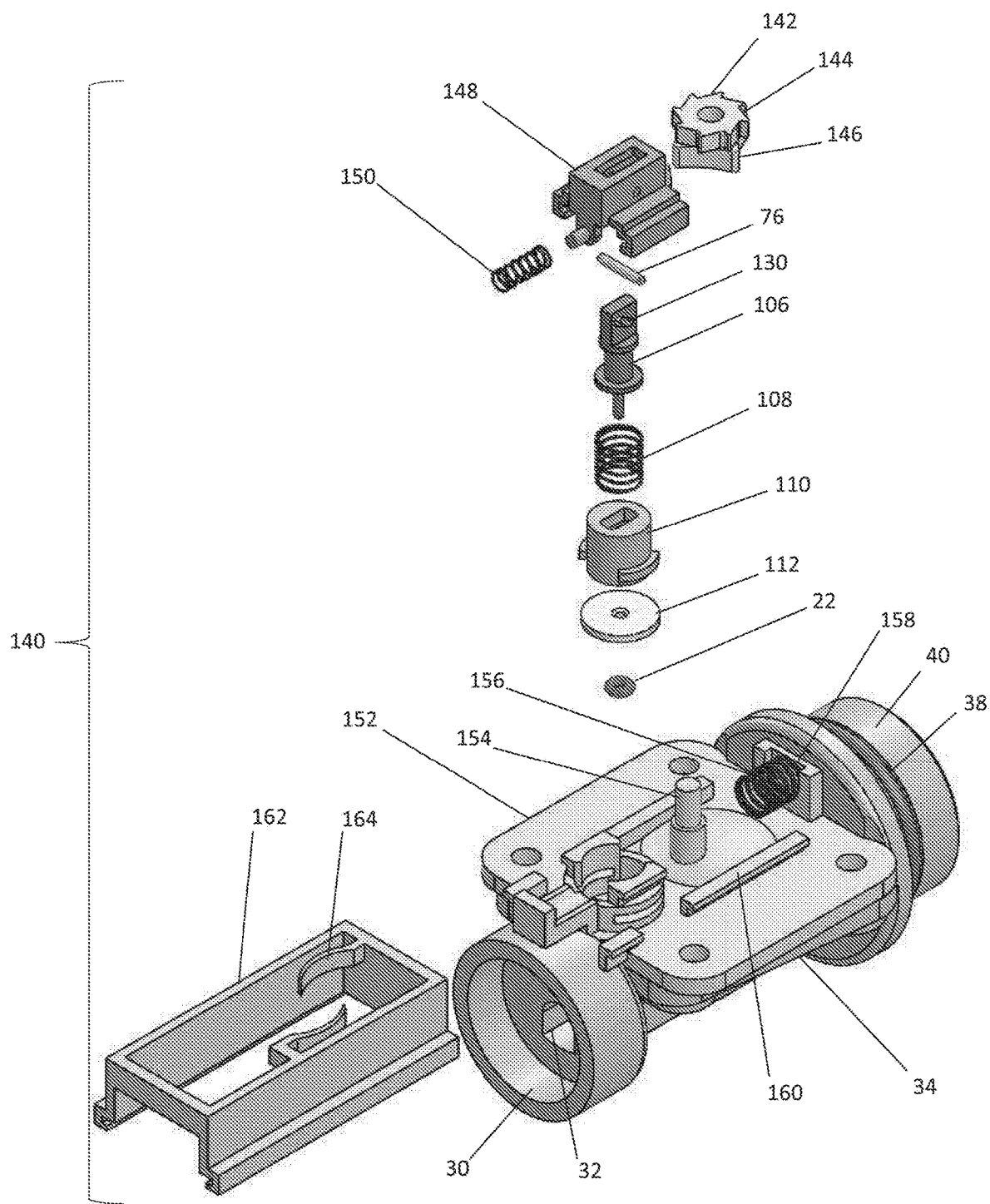
FIG. 17 is an exploded view of the inventive horizontal/perpendicular push mechanism of FIGS. 15A and 15B.

FIG. 17 is an exploded view of the inventive perpendicular push mechanism 140. The perpendicular push mechanism 140 has an outer trolley 162 with ratchet arms 164 that travels back and forth on tracks 160, on every push action, and with each back and forth action makes a ratchet wheel 142 turn 90 degrees (via ratchet mechanism). Outer trolley return spring 156 is attached to valve cover 152 with retaining stop 158. The ratchet wheel 142 rotates on the ratchet and cam wheel pivot 154. On the bottom of the ratchet wheel there is a cam wheel 146 that follows the tip 166 of the inner trolley 148, and makes inner trolley 148 go forward or backwards. The inner trolley 148 makes the seal pin 106 go up and down in response to the seal pin cam pivot 76 in the trolley 148 riding in the slanted slot 130. The seal pin 106 is biased by a seal pin return spring 108 which are housed in a seal pin housing 110 that sits on a seal cap 112 and an O-ring 22. The tip of the seal pin extends through and travels through the seal cap 112 and an O-ring 22. The relationship between the components of horizontal/perpendicular push mechanism 140 is shown in the cross-sectional view of FIG. 16. Also, shown in FIG. 16 is the diaphragm 42 and diaphragm spring 44. The valve cover 152 also serves as a diaphragm chamber cover that holds the top portion of the diaphragm spring 44 while the lower portion of the diaphragm spring 44 rests on the diaphragm 42. The hydraulic valve assembly 34 with a diaphragm 42 either allows water to go downstream to the valve outlet 30 or shuts off the water flow from the pressurized fluid source FIGS. 18A and 18B are cross-sectioned views of the inventive horizontal/perpendicular push mechanism of FIGS. 15A and 15B in a closed and open position, respectively. As shown in FIG. 18A with the inner trolley 148 position to the left side (output) of the valve assembly the seal pin return spring 108 biases the seal pin 106 downward into the diaphragm 42 and blocks channel 46 that extends through the diaphragm 42 and valve body 34. In FIG. 18B with the piston 16 pushed inward the seal pin cam pivot 76 in the inner trolley 148 rides in a slanted slot 130 (to the right toward valve input in FIG. 15B) and raises the seal pin 106 upward and out of the diaphragm 42 and out of the channel 46 that extends through the diaphragm 42 and valve body 34.

FIGS. 19A and 19B illustrate side and bottom views of the actuation of the ratchet and cam wheel pivot 142 in response to the pushing of the inventive horizontal/perpendicular push mechanism of FIGS. 15A and 15B. FIG. 19A shows the position of the inner trolley 148 and seal pin 106 in relation to the ratchet wheel 142, and the position of the tip 166 on the cam wheel 146 in the valve open position. FIG. 19B shows the position of the inner trolley 148 and seal pin 106 in relation to the ratchet wheel 142, and the position of the tip 166 on the cam wheel 146 in the valve closed position.

FIGS. 20A and 20B illustrate perspective views of the actuation of the ratchet and cam wheel pivot in response to the pushing of the inventive horizontal/perpendicular push mechanism of FIGS. 19A and 19B in the open and closed position, respectively.

Figure 21:
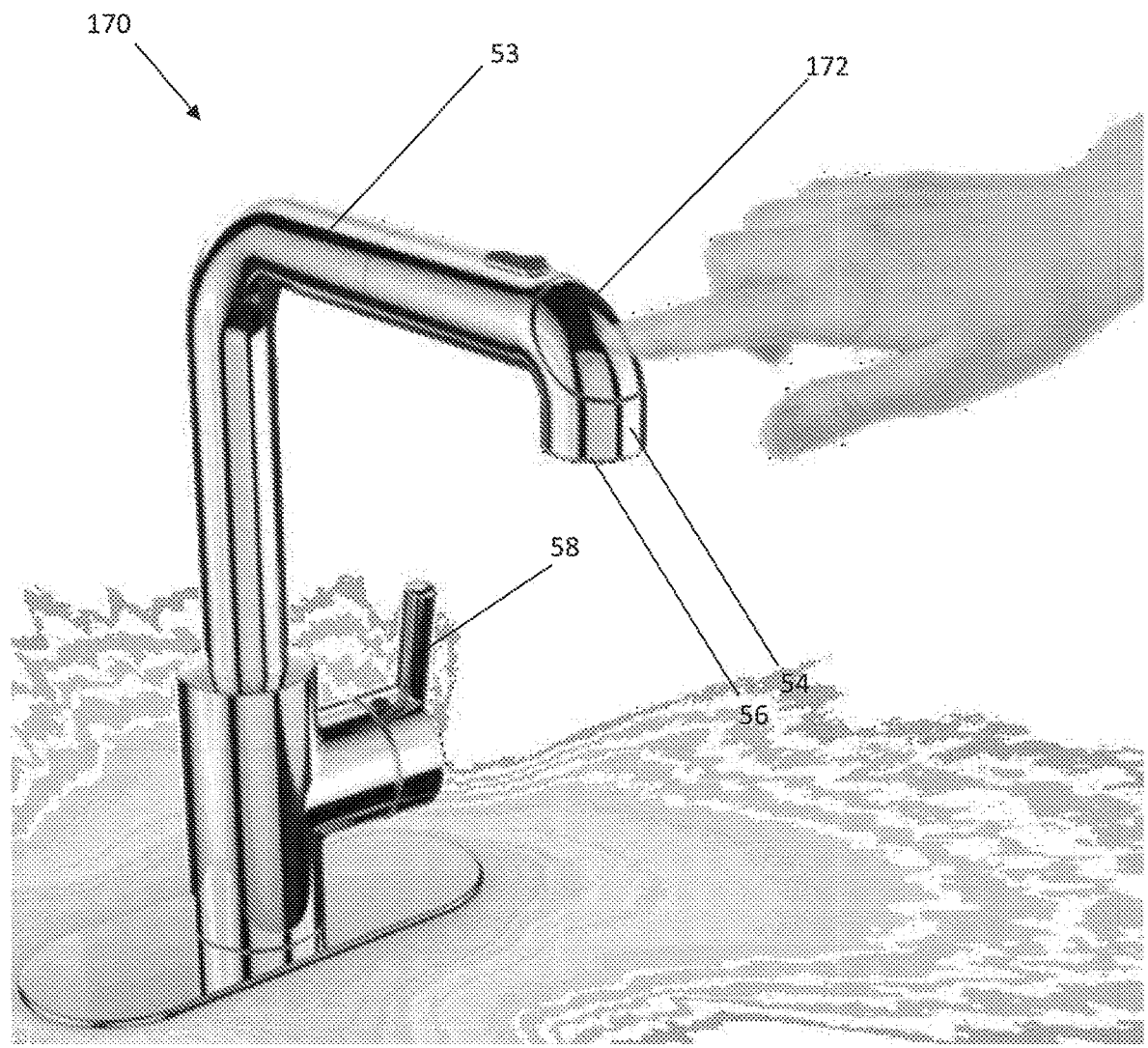
FIG. 21 is a pictorial view of a faucet design employing a push button to actuate the underlying inventive horizontal/perpendicular push mechanism of FIGS. 11A and 11B or FIGS. 15A and 15B.

FIG. 21 is a pictorial view of a faucet design employing a push button to actuate the underlying inventive horizontal/perpendicular push mechanism of FIGS. 11A and 11B or FIGS. 15A and 15B.

FIG. 21 shows a faucet design shown generally at 170 employing the underlying inventive horizontal/perpendicular push mechanism of FIGS. 11A and 11B or FIGS. 15A and 15B, and characterized by having a neck region 53, a spout 54, and fluid outlet 56 with a large touch surface segment 172. It is appreciated that the neck region 53 need not have a bend relative to the downstream portion as determined relative to a pressurized water supply (not shown) that is in fluid communication with the faucet 170. The rocker touch surface segment 172 while depicted at the spout 54 is appreciated to be amenable to be positioned anywhere on the faucet 170 to which a user has touch access. The faucet 170 may have an outer surface that is made of chrome plated materials, stainless steel, metals, plastics, composite materials, and combinations thereof; and in contrast to the conventional touch faucet need not be electrically conductive. In operation, a user depresses the touch rocker surface segment 172 through a pre-defined travel distance on one end side of the surface 172 to open the water or fluid flow and once again on an opposing end side of the surface 172 to close the water or fluid flow. In the embodiment depicted, the surface 172 locks in a depressed position for continuous water flow from the pressurized fluid supply until the opposing side is pressed to close the water flow.

The water temperature and flow rate in this embodiment are controlled by a traditional mixing valve 58. It is appreciated that in other embodiments of the inventive touch faucet may lack a mixing valve 58, and may simply dispense water at a single rate and single temperature.

The foregoing description is illustrative of particular embodiments of the invention, but is not meant to be a limitation upon the practice thereof. The following claims, including all equivalents thereof, are intended to define the scope of the invention.

The invention claimed is:

1. A switching module for mechanical faucets comprising:
   a modular control mechanism in mechanical communication with a valve assembly, where said modular control mechanism comprises:
   a piston twist button which sits atop a piston and a piston return spring;
   a seal pin inserted into said piston with a seal pin return spring positioned between a base of said seal pin and a lower cavity of said piston, where the seal pin return spring is biased to push said seal pin downward toward said valve assembly; and
   where said valve assembly comprises:
   a housing;

an input in said housing with an O-ring that seals the valve assembly to a set of internal walls of the faucet;
a valve outlet in said housing;
a valve cover that attaches to said modular control mechanism;
a diaphragm and a diaphragm spring, and where said diaphragm spring is biased to push said diaphragm into sealed contact with said housing of said valve assembly; and
wherein when the piston twist button is depressed a first time, the piston depresses the seal pin to create a seal to act upon a channel in said diaphragm to shut off fluid flow from a pressurized source, and when the piston twist button is depressed a second time, the piston return spring returns the piston so that it no longer depresses the seal pin thereby allowing fluid downstream to said valve outlet from the pressurized fluid source.

2. The switching module of claim 1 wherein said modular control mechanism is a push-pin mechanism.

3. The switching module of claim 1 wherein said modular control mechanism is a rocker mechanism.

4. The switching module of claim 1 wherein said modular control mechanism is a horizontal/perpendicular push push mechanism.

5. A faucet device for coupling to a pressurized fluid supply comprising:
a faucet with a depressible surface segment and an outlet; and
the switching module of claim 1 actuated by said depressible surface segment, said switching module inducing fluid flow from the pressurized fluid supply through the outlet in response to a user depression of said depressible surface segment.

6. The device of claim 5 wherein said faucet further comprises a mixing valve for control of fluid temperature and flow rate.

7. The device of claim 5 wherein the fluid flow from the pressurized fluid supply further comprises at least one of water, carbonated beverages, alcoholic drinks, medicaments, juices, organic liquids, and other compositions.

8. The device of claim 5 wherein said depressible surface segment is positioned on a neck region of the faucet.

9. The device of claim 5 wherein the device has an outer surface that is made of chrome plated materials, stainless steel, metals, plastics, composite materials, and combinations thereof.

10. A switching module for mechanical faucets comprising:
a modular control mechanism in mechanical communication with a valve assembly, where said modular control mechanism comprises:
a piston twist button which sits atop a piston and a piston return spring;
a seal pin inserted into said piston, said seal pin having a seal pin return spring positioned on a base of said seal pin biased to push said seal pin toward said valve assembly; and
where said valve assembly comprises:
a housing;
an input in said housing with an O-ring that seals the valve assembly to a set of internal walls of the faucet;
a valve outlet in said housing;
a valve cover that attaches to said housing;
a diaphragm and a diaphragm spring, and where said diaphragm spring is biased to push said diaphragm into sealed contact with said housing of said valve assembly; and
wherein when the piston twist button is depressed a first time, the piston depresses the seal pin to create a seal to act upon a channel in said diaphragm to shut off fluid flow from a pressurized source, and when the piston twist button is depressed a second time, the piston return spring returns the piston so that it no longer depresses the seal pin thereby allowing fluid flow from the pressurized fluid source and wherein said piston and said seal pin are configured to move axially orthogonal to said diaphragm.

11. The switching module of claim 10 wherein said modular control mechanism is a push-pin mechanism.

12. A switching module for mechanical faucets comprising:
a modular control mechanism in mechanical communication with a valve assembly, where said modular control mechanism comprises:
a piston twist button which sits atop a piston and a piston return spring, said piston twist button being axially depressible;
a seal pin inserted into said piston, said seal pin having a seal pin return spring positioned on a base of said seal pin biased to push said seal pin toward said valve assembly; and
where said valve assembly comprises:
a housing;
an input in said housing with an O-ring that seals the valve assembly to a set of internal walls of the faucet;
a valve outlet in said housing;
a valve cover that attaches to said housing;
a diaphragm and a diaphragm spring, and where said diaphragm spring is biased to push said diaphragm into sealed contact with said housing of said valve assembly; and
wherein when the piston twist button is depressed a first time, the piston depresses the seal pin to create a seal to act upon a channel in said diaphragm to shut off fluid flow from a pressurized source, and when the piston twist button is depressed a second time, the piston return spring returns the piston so that it no longer depresses the seal pin thereby allowing fluid downstream to said valve outlet from the pressurized fluid source.

13. The switching module of claim 12 wherein said modular control mechanism is a push-pin mechanism.

* * * * *